United States Patent
Yagihashi (10) Patent No.: US 7,721,707 B2
(45) Date of Patent: May 25, 2010

(54) ABNORMALITY DETERMINATION APPARATUS AND ABNORMALITY DETERMINATION METHOD FOR VALVE

(75) Inventor: Nobuo Yagihashi, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 112 days.

(21) Appl. No.: 11/938,448

(22) Filed: Nov. 12, 2007

(65) Prior Publication Data
US 2008/0183363 A1 Jul. 31, 2008

(30) Foreign Application Priority Data
Nov. 13, 2006 (JP) ............................. 2006-306609

(51) Int. Cl.
*F02D 41/00* (2006.01)
*G01M 19/00* (2006.01)
(52) U.S. Cl. .................................. 123/361; 73/114.32
(58) Field of Classification Search ................. 123/336, 123/337, 396, 361, 399; 73/114.01–114.77; 702/183
See application file for complete search history.

(56) References Cited

U.S. PATENT DOCUMENTS

| | | | | |
|---|---|---|---|---|
| 4,888,996 A * | 12/1989 | Rak et al. | ............... | 73/862.193 |
| 5,150,679 A * | 9/1992 | Peter | ........................... | 123/397 |
| 5,473,936 A * | 12/1995 | Sasakura et al. | ......... | 73/114.36 |
| 5,675,080 A * | 10/1997 | Wada | ...................... | 73/114.74 |
| 5,679,891 A * | 10/1997 | Matsuno et al. | .......... | 73/114.37 |
| 5,746,174 A * | 5/1998 | Abe et al. | .................... | 123/306 |
| 6,135,085 A * | 10/2000 | Toyohara et al. | ............ | 123/306 |
| 6,154,351 A * | 11/2000 | Takano et al. | .................. | 361/23 |
| 6,539,918 B1* | 4/2003 | Pursifull | ..................... | 123/399 |
| 6,684,689 B2* | 2/2004 | Fromm et al. | ............ | 73/114.37 |
| 6,711,492 B1* | 3/2004 | Pursifull et al. | ............. | 701/114 |
| 6,834,627 B2* | 12/2004 | Hiraku et al. | ............. | 123/90.15 |
| 7,084,594 B2* | 8/2006 | Itabashi et al. | ......... | 318/400.22 |
| 7,111,610 B2* | 9/2006 | Nidigattu | .................... | 123/399 |
| 7,197,917 B2* | 4/2007 | Hasegawa | ................. | 73/114.37 |
| 2004/0003656 A1* | 1/2004 | Ishiguro et al. | ............ | 73/118.1 |
| 2006/0016427 A1* | 1/2006 | Uda et al. | .................... | 123/399 |

FOREIGN PATENT DOCUMENTS

| | | | |
|---|---|---|---|
| JP | 04-012155 A | | 1/1992 |
| JP | 7-116982 | | 12/1995 |
| JP | 10-121991 A | | 5/1998 |
| JP | 11190230 A | * | 7/1999 |
| JP | 2000-073843 A | | 3/2000 |
| JP | 2001-234796 A | | 8/2001 |

* cited by examiner

*Primary Examiner*—Stephen K Cronin
*Assistant Examiner*—David Hamaoui
(74) *Attorney, Agent, or Firm*—Sughrue Mion, PLLC (57) ABSTRACT

An engine ECU executes a program including the step of controlling a driver motor which operates a TCV (tumble control valve) such that the TCV in the full-open state closes to a predetermined opening position (S106), the step of detecting the electric current value of the driver motor (S108), and the step of determining that the TCV is abnormal (S112) in a case where the electric current value of the driver motor is smaller than a determination value S (I) (YES in S110).

9 Claims, 6 Drawing Sheets

ABNORMALITY DETERMINATION APPARATUS AND ABNORMALITY DETERMINATION METHOD FOR VALVE

This nonprovisional application is based on Japanese Patent Application No. 2006-306609 filed with the Japan Patent Office on Nov. 13, 2006, the entire contents of which are hereby incorporated by reference.

BACKGROUND OF THE INVENTION

1. Field of the Invention

The present invention relates to an abnormality determination apparatus and an abnormality determination method for a valve, and particularly to a technique of determining abnormality of a valve provided to an intake passage of an internal combustion engine.

2. Description of the Background Art

A tumble control valve (also referred to as TCV hereinlater) that strengthens a tumble flow in a cylinder has conventionally been known. The tumble flow strengthened by the TCV can gather fuel around a spark plug for example. Therefore, by operating an internal combustion engine under a considerably lean air-fuel ratio condition, the emission property can be improved. Since the TCV has a great influence on the emission property, it is necessary to determine, using an OBD (On Board Diagnostic system), whether or not the TCV is abnormal.

Japanese Patent Laying-Open No. 10-121991 discloses a fault diagnostic apparatus for an engine intake control system that controls the intake airflow by opening/closing an intake control valve provided to an engine intake system based on the engine operating state and that corrects the quantity of injected fuel by increasing or decreasing the fuel quantity for acceleration or deceleration. The fault diagnostic apparatus for the engine intake control system disclosed in the above-referenced patent document includes diagnostic means for determining that the intake control system fails when the air-fuel ratio has, in the period during which the fuel quantity is corrected by increasing it or the period during which the fuel quantity is corrected by decreasing it, any value that it never has during normal operation of the intake control valve.

The fault diagnostic apparatus disclosed in the patent document determines that the intake control system fails when the air-fuel ratio has, in the period during which the fuel quantity is corrected by increasing it for acceleration or the period during which the quantity is corrected by decreasing it for deceleration, a value that it never has during normal operation of the intake control valve. Under the conditions that the intake control system fails and the intake control valve is closed at the time of acceleration at which the operation changes from low-load operation to high-load operation, the charging efficiency is decreased due to the intake air resistance resultant from the fact that the intake control valve is closed so as to cause the quantity of fresh charge taken into the combustion chamber to decrease as compared with normal operation. At this time, the air-fuel ratio is rich and has any value that never occurs while the intake control valve normally operates. In contrast, under the conditions that the intake control system fails and the intake control valve is opened at the time of deceleration at which the operation changes from high-load operation to low-load operation, the charging efficiency is increased due to the fact that the intake control valve is opened to cause the quantity of fresh charge taken into the combustion chamber to increase. At this time, the air-fuel ratio is lean and has any value that never occurs while the intake control valve normally operates. Therefore, by determining the air-fuel ratio in the period during which the fuel quantity is increased for acceleration or the period during which the fuel quantity is decreased for deceleration, failure of the intake control system can be diagnosed.

The internal combustion engine of the common automobile has a plurality of cylinders. In such an internal combustion engine, each cylinder is provided with at least one TCV. The air-fuel ratio sensor detecting the air-fuel ratio does not detect the air-fuel ratio of each cylinder but detects the air-fuel ratio of the internal combustion engine as a whole. Therefore, if only one of a plurality of TCV is abnormal, there is a small influence on the air-fuel ratio detected by the air-fuel ratio sensor. Therefore, in the case where the failure of the TCV is determined from the air-fuel ratio as done by the failure diagnostic apparatus disclosed in Japanese Patent Laying-Open No. 10-121991, abnormality of any one of a plurality of TCV may not be detected in some cases.

SUMMARY OF THE INVENTION

An object of the present invention is to provide an abnormality determination apparatus and an abnormality determination method for a valve that can precisely determine abnormality of a valve provided to an intake passage of an internal combustion engine.

An abnormality determination apparatus for a valve according to one aspect of the present invention is an abnormality determination apparatus for a valve provided to an intake passage of an internal combustion engine. The abnormality determination apparatus includes an actuator operating the valve and an operation unit. The operation unit detects a driving force of the actuator and determines that the valve is abnormal in a case where the driving force of the actuator is smaller than a predetermined determination value.

With this configuration, the driving force of the actuator operating the valve provided to the intake passage of the internal combustion engine is detected. Since the valve is provided to the intake passage, the load of the actuator operating the valve is increased according to increase of the intake air quantity. In the case where abnormality such as breakage of the valve occurs, the load of the actuator is accordingly decreased. For example, it is supposed that a plurality of valves are operated by a single actuator. Even when abnormality such as breakage of any one of the valves occurs, the load of the actuator is accordingly decreased. Therefore, the driving force for operating the actuator is decreased. Thus, in the case where the driving force of the actuator is smaller than a predetermined determination value, it is determined that the valve is abnormal. Thus, in the case where a plurality of valves are operated by one actuator and abnormality such as breakage of any one of these valves occurs, it can be determined that the valve is abnormal. In this way, the abnormality determination apparatus or abnormality determination method for a valve can be provided with which abnormality of the valve provided to the intake passage of the internal combustion engine can be precisely determined.

Preferably, the operation unit corrects the determination value such that the determination value is larger as time consumed by the valve to operate by a predetermined operating quantity while the internal combustion engine is stopped is longer.

With this configuration, the determination value is corrected such that the determination value is larger as the time consumed by the valve to operate by a predetermined operating quantity while the internal combustion engine is stopped is longer. Thus, the determination value can be corrected based on the time consumed by the valve to operate by a predetermined operating quantity while the force exerted by the intake air to the internal combustion engine does not act on the valve. Therefore, any influence of change with time of the load for example exerted by a mechanism itself for operating the valve can be reflected on the determination value. As a result, abnormality of the valve can be precisely determined.

More preferably, the valve is a tumble control valve.

With this configuration, for the internal combustion engine having the tumble control valve provided to the intake passage, abnormality of the tumble control valve can be precisely determined.

An abnormality determination apparatus for a valve according to another aspect of the present invention is an abnormality determination apparatus for a valve provided to an intake passage of an internal combustion engine. The abnormality determination apparatus includes an actuator operating the valve and an operation unit. The operation unit measures time consumed by the valve to operate by a predetermined operating quantity and determines that the valve is abnormal in a case where the time consumed by the valve to operate by the predetermined operating quantity is shorter than a predetermined determination value.

With this configuration, the time consumed by the valve provided to the intake passage of the internal combustion engine to operate by a predetermined operating quantity is measured. Since the valve is provided to the intake passage, the load of the actuator operating the valve is increased according to increase of the intake air quantity. When abnormality such as breakage of the valve occurs, the load of the actuator is accordingly decreased. For example, it is supposed that a plurality of valves are operated by a single actuator. Even when abnormality such as breakage of any one of the valves occurs, the load of the actuator is accordingly decreased. Thus, the time required for operating the valve is shortened. Therefore, in the case where the time consumed by the valve to operate by a predetermined operating quantity is shorter than a predetermined determination value, it is determined that the valve is abnormal. Thus, in the case where a plurality of valves are operated by one actuator and abnormality such as breakage of any one of these valves occurs, it can be determined that the valve is abnormal. In this way, the abnormality determination apparatus or abnormality determination method for a valve can be provided with which abnormality of the valve provided to the intake passage of the internal combustion engine can be precisely determined.

Preferably, the operation unit corrects the determination value such that the determination value is larger as time consumed by the valve to operate by a predetermined operating quantity while the internal combustion engine is stopped is longer.

With this configuration, the determination value is corrected such that the determination value is larger as the time consumed by the valve to operate by a predetermined operating quantity while the internal combustion engine is stopped is longer. Thus, the determination value can be corrected based on the time consumed by the valve to operate by a predetermined operating quantity while the force exerted by the intake air to the internal combustion engine does not act on the valve. Therefore, any influence of change with time of the load for example exerted by a mechanism itself for operating the valve can be reflected on the determination value. As a result, abnormality of the valve can be precisely determined.

More preferably, the valve is a tumble control valve.

With this configuration, for the internal combustion engine having the tumble control valve provided to the intake passage, abnormality of the tumble control valve can be precisely determined.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings. In the following description, like components are denoted by like reference characters. They are named identically and also function identically. Therefore, a detailed description thereof will not be repeated.

First Embodiment

Figure 1:
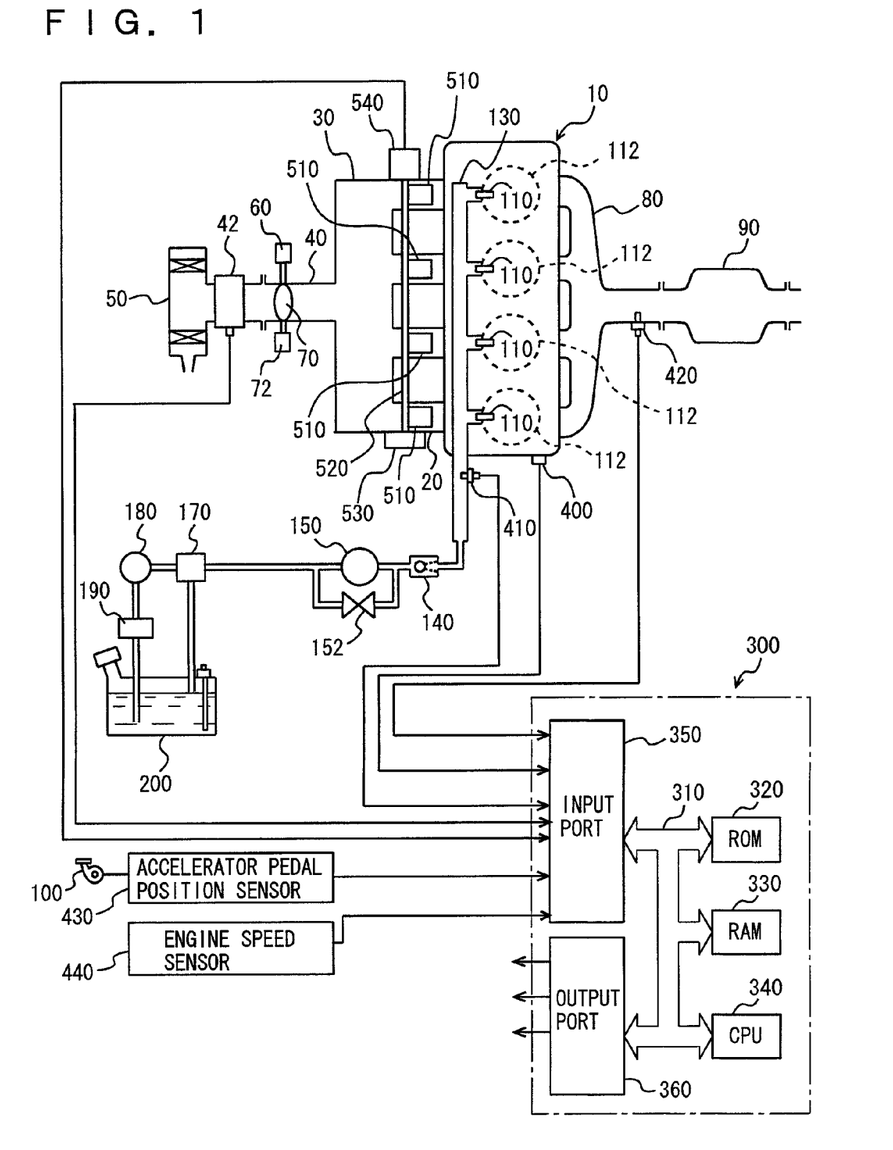
FIG. 1 is a schematic configuration diagram of an engine system controlled by an engine ECU that is an abnormality determination apparatus according to a first embodiment of the present invention.

FIG. 1 shows a schematic configuration diagram of an engine system controlled by an engine ECU (Electronic Control Unit) that is an abnormality determination apparatus according to a first embodiment of the present invention. While FIG. 1 shows an engine that is an inline-4 gasoline engine, the present invention is not limited to such an engine and is applicable to engines of various types such as V6 engine and V8 engine. The abnormality determination apparatus in the present embodiment is implemented by a program stored in a ROM (Read Only Memory) of the engine ECU for example.

As shown in FIG. 1, engine 10 includes four cylinders 112 connected via respective associated intake manifolds 20 to a common surge tank 30. Surge tank 30 is connected via an intake duct 40 to an air cleaner 50. In intake duct 40, an airflow meter 42 is disposed and throttle valve 70 driven by an electric motor 60 is disposed. Throttle valve 70 has its opening position controlled independently of an accelerator pedal 100, based on an output signal of engine ECU 300. The opening position of throttle valve 70 (throttle opening position) is detected by a throttle opening position sensor 72.

Cylinders 112 are coupled to a common exhaust manifold 80, and exhaust manifold 80 is coupled to a three-way catalytic converter 90.

Cylinders 112 are provided with respective in-cylinder injectors 110 for injecting fuel into the cylinder. In-cylinder injectors 110 are each controlled based on an output signal of engine ECU 300. In-cylinder injectors 110 are connected to a common fuel delivery pipe 130, and fuel delivery pipe 130 is connected to an engine-driven high-pressure fuel pump 150 via a check valve 140 allowing a flow toward fuel delivery pipe 130.

As shown in FIG. 1, the discharge side of high-pressure fuel pump 150 is connected via an electromagnetic spill valve 152 to the intake side of high-pressure fuel pump 150. As the degree of opening of electromagnetic spill valve 152 is smaller, the quantity of the fuel supplied from high-pressure fuel pump 150 into fuel delivery pipe 130 increases. When electromagnetic spill valve 152 is fully open, the fuel supply from high-pressure fuel pump 150 to fuel delivery pipe 130 is stopped. Electromagnetic spill valve 152 is controlled based on an output signal of engine ECU 300.

High-pressure fuel pump 150 is connected via a fuel pressure regulator 170 to a low-pressure fuel pump 180 of an electric motor-driven type. Further, low-pressure fuel pump 180 is connected via a fuel filter 190 to a fuel tank 200. Fuel pressure regulator 170 is configured to return a part of the fuel discharged from low-pressure fuel pump 180 back to fuel tank 200 when the pressure of the fuel discharged from low-pressure fuel pump 180 is higher than a predetermined set fuel pressure. This prevents the pressure of the fuel supplied to high-pressure fuel pump 150 from becoming higher than the above-described set fuel pressure.

A fuel supply system of the engine system is configured to include in-cylinder injectors 110, fuel delivery pipe 130, check valve 140, high-pressure fuel pump 150, electromagnetic spill valve 152, fuel pressure regulator 170, low-pressure fuel pump 180, fuel filter 190 and fuel tank 200.

Engine ECU 300 is configured using a digital computer, and includes a ROM 320, a RAM (Random Access Memory) 330, a CPU (Central Processing Unit) 340, an input port 350, and an output port 360 that are connected to each other via a bidirectional bus 310.

Airflow meter 42 generates an output voltage proportional to an intake air quantity, and the output voltage of airflow meter 42 is input to input port 350. A coolant temperature sensor 400 is attached to engine 10, and generates an output voltage proportional to a coolant temperature of the engine, and the output voltage of coolant temperature sensor 400 is input to input port 350.

A fuel pressure sensor 410 is attached to fuel delivery pipe 130, and generates an output voltage proportional to the fuel pressure within fuel delivery pipe 130. The output voltage of fuel pressure sensor 410 is input to input port 350.

An air-fuel ratio sensor 420 is attached to an exhaust manifold 80 located upstream of three-way catalytic converter 90. Air-fuel ratio sensor 420 generates an output voltage proportional to an oxygen concentration within the exhaust gas, and the output voltage of air-fuel ratio sensor 420 is input to input port 350.

Air-fuel ratio sensor 420 of the engine system in the present embodiment is a full-range air-fuel ratio sensor (linear air-fuel ratio sensor) that generates an output voltage proportional to the air-fuel ratio of the air-fuel mixture burned in engine 10. As air-fuel ratio sensor 420, an $O_2$ sensor may be employed that detects, in an on/off manner, whether the air-fuel ratio of the air-fuel mixture burned in engine 10 is rich or lean with respect to a stoichiometric air-fuel ratio.

Accelerator pedal 100 is connected to an accelerator pedal position sensor 430 that generates an output voltage proportional to the degree to which accelerator pedal 100 is pressed down, and the output voltage of accelerator pedal position sensor 430 is input to input port 350. Further, an engine speed sensor 440 generating an output pulse representing the engine speed is connected to input port 350.

Based on the engine load factor and the engine speed obtained by the above-described accelerator pedal position sensor 430 and engine speed sensor 440, ROM 320 of engine ECU 300 stores in advance, in the form of a map, values of fuel injection quantity that are set in association with operating states (quantity of intake air for example) and correction values thereof set based on the engine coolant temperature.

As shown in FIG. 1, in intake manifold 20, one TCV 510 per cylinder 112, namely four TCV 510 are provided for respective cylinders 112. Four TCV 510 are fixed to one shaft 520 with bolts or the like. Shaft 520 is rotated by one driver motor 530. Namely, four TCV 510 are opened/closed by one driver motor 530.

The opening position of TCV 510, namely the operating quantity of driver motor 530 is detected by an opening position sensor 540. Opening position sensor 540 generates an output voltage proportional to the opening position of TCV 510, and the output voltage of opening position sensor 540 is input to input port 350.

The driving force of driver motor 530 is proportional to the value of electric current (hereinafter referred to as current value). The current value of driver motor 530 is controlled by at least integral control by engine ECU 300 using a difference between the opening position and a target opening position such that the opening position of TCV 510 is equal to the target opening position. Therefore, the current value of driver motor 530 is larger as the period of time is longer during which there is a difference between the opening position and the target opening position of TCV 510.

Figure 2:
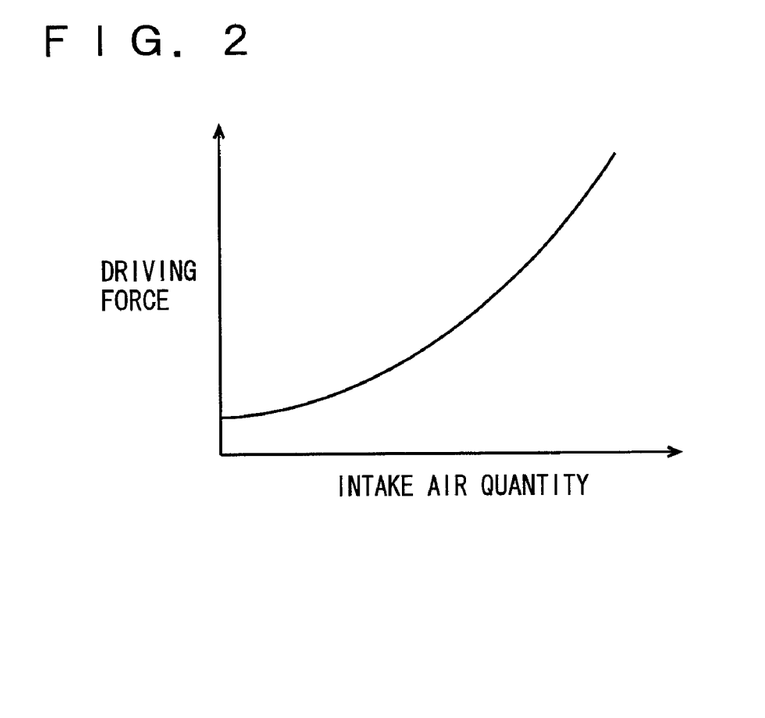
FIG. 2 is a (first) illustration showing a driving force of a driver motor.

For example, as the quantity of intake air is larger, the force acting on TCV 510, namely the load of driver motor 530 is larger. Therefore, the period of time during which there is a difference between the opening position of TCV 510 and the target opening position thereof is longer, namely the time consumed by TCV 510 to reach the target opening position is longer. Thus, as shown in FIG. 2, as the quantity of intake air is larger, the driving force of driver motor 530 is larger. The method of controlling the current value of driver motor 530 is not limited to the above-described one.

Figure 3:
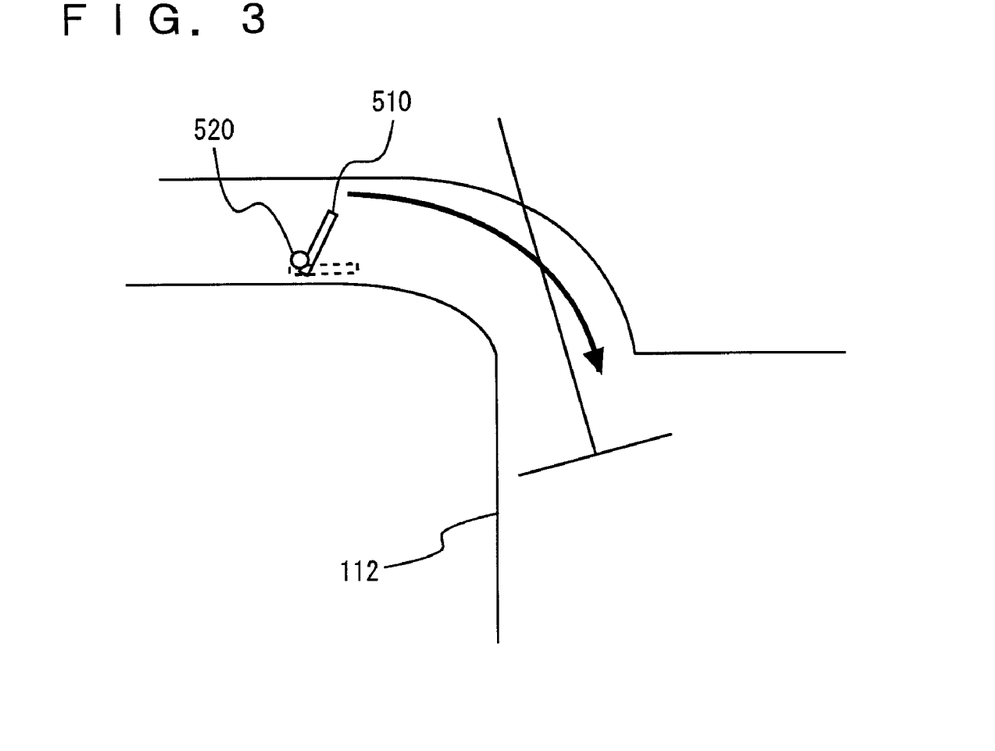
FIG. 3 shows a TCV.

As shown by the solid line in FIG. 3, in the state where TCV 510 is closed, the tumble flow in cylinder 112 is strengthened as compared with the state where the TCV is full open as indicated by the broken line in FIG. 3. The strengthened tumble flow facilitates collection of injected fuel around the spark plug. Therefore, the internal combustion engine can be operated under a considerably lean air-fuel-ratio condition, for example, so that the emission property can be improved.

Here, if any abnormality such as breakage of TCV 510 occurs, TCV 510 cannot be opened/closed in normal manner. Since TCV 510 has a great influence on the emission property, it is necessary to determine whether TCV 510 is abnormal or not using the OBD.

Figure 4:
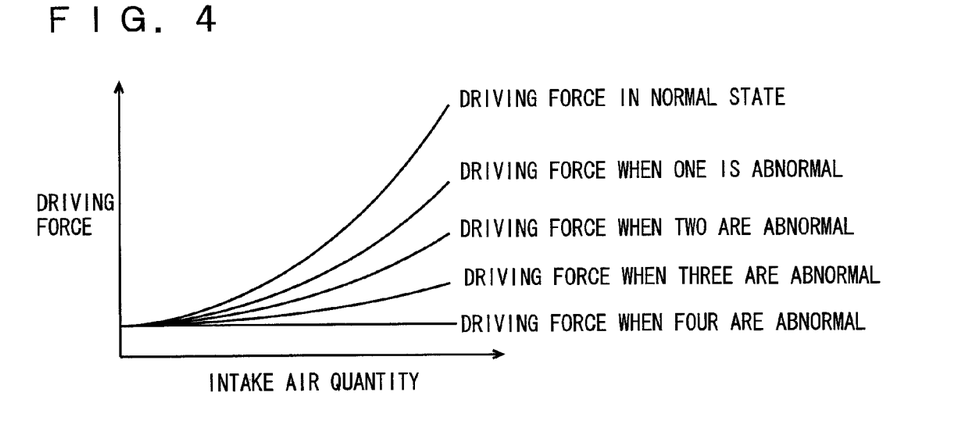
FIG. 4 is a (second) illustration showing the driving force of the driver motor.

Here, as described above, the driving force of driver motor 530 varies depending on the quantity of intake air, namely the force acting on TCV 510. Therefore, as shown in FIG. 4, as the number of abnormal TCV 510 such as broken TCV 510 is larger, the driving force of driver motor 530 is smaller. Thus, the present embodiment determines whether or not TCV 510 is abnormal based on the driving force, namely the current value of driver motor 530.

Figure 5:
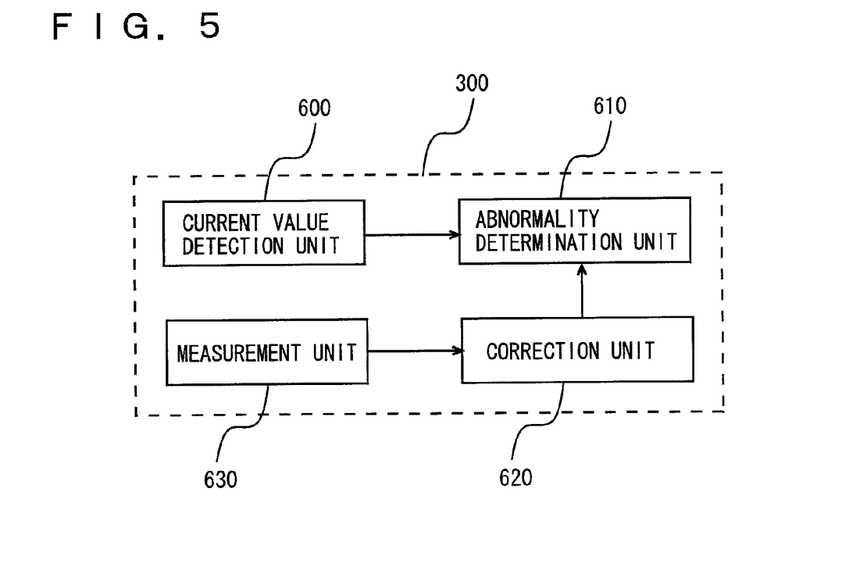
FIG. 5 is a functional block diagram of the engine ECU that is the abnormality determination apparatus according to the first embodiment of the present invention.

Referring to FIG. 5, functions of engine ECU 300 that is the abnormality determination apparatus in the present embodiment will be described. The functions of engine ECU 300 as described below may be implemented by hardware or implemented by software.

Engine ECU 300 includes a current value detection unit 600, an abnormality determination unit 610, a correction unit 620 and a measurement unit 630. Current value detection unit 600 detects the current value of driver motor 530. Since the current value of driver motor 530 is determined by engine ECU 300 itself, the current value of driver motor 530 is detected within engine ECU 300.

Abnormality determination unit 610 determines that TCV 510 is abnormal in the case where the current value of driver motor 530 is smaller than a determination value S (I). Determination value S (I) is determined according to a map using the intake air quantity as a parameter such that determination value S (I) corresponds to a current value of driver motor 530 when all TCV 510 are normal.

Correction unit 620 corrects determination value S (I) based on the time required by TCV 510 to change from the full-close state to the full-open state while engine 10 is stopped. For example, determination value S (I) is corrected such that the determination value is larger as the time required by TCV 510 to change from the full-close state to the full-open state while engine 10 is stopped is longer.

Measurement unit 630 measures the time required by TCV 510 to change from the full-close state to the full-open state while engine 10 is stopped.

Figure 6:
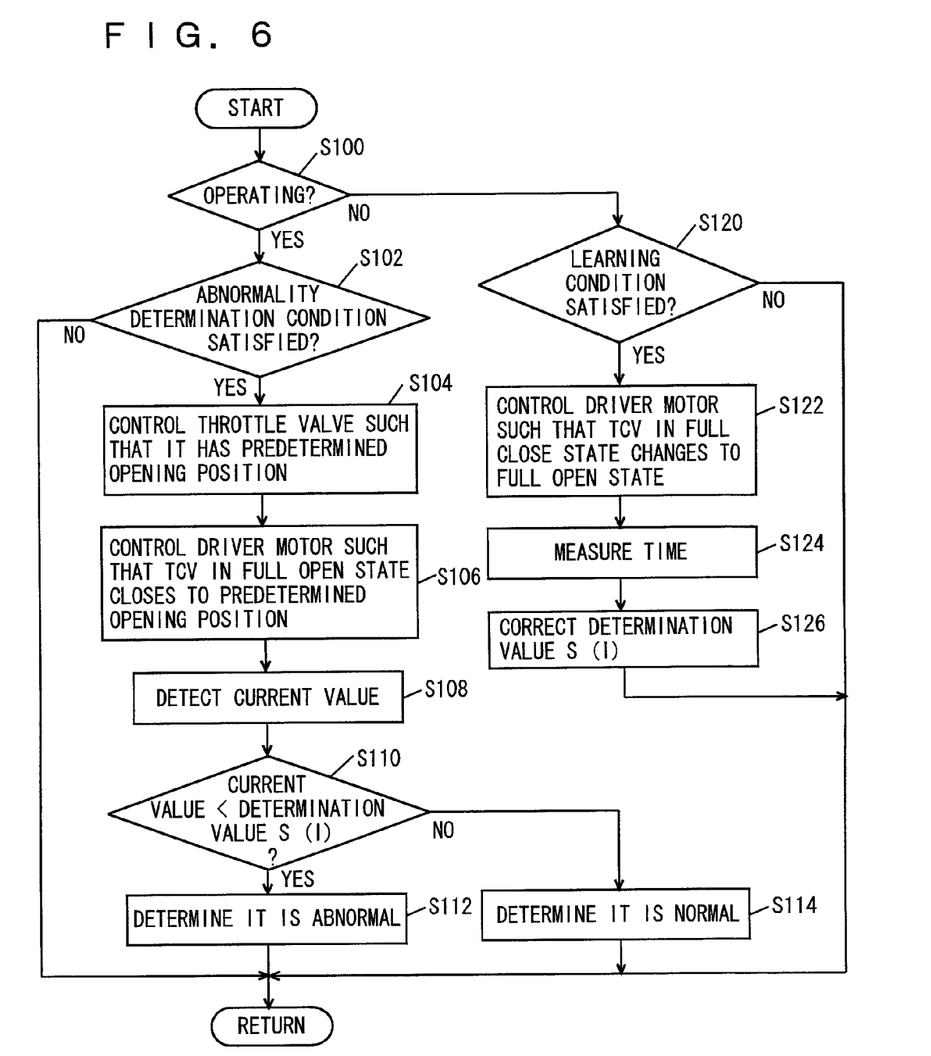
FIG. 6 is a flowchart showing a control structure of a program executed by the engine ECU that is the abnormality determination apparatus according to the first embodiment of the present invention.

Referring to FIG. 6, a control structure is described of a program executed by engine ECU 300 that is the abnormality determination apparatus in the present embodiment. The program as described hereinlater is repeatedly executed in predetermined cycles. In the case where engine 10 is stopped, namely engine ECU 300 is not started, engine ECU 300 is started by a timer to execute the program described below.

In step (hereinafter step is abbreviated as S) 100, engine 300 determines whether or not engine 10 is operating. When engine 10 is operating (YES in S100), the process proceeds to S102. Otherwise (NO in S100), the process proceeds to S120.

In S102, engine ECU 300 determines whether or not a predetermined abnormality determination condition is satisfied. Here, the abnormality determination condition refers to the condition for example that fuel cut is effected, the intake air quantity is in a predetermined range, the engine speed is in a predetermined range and the rate of change of the engine speed is equal to or smaller than a threshold value. The abnormality determination condition is not limited to the above-described one. When the abnormality determination condition is satisfied (YES in S102), the process proceeds to S104. Otherwise (NO in S102), the process is ended.

In S104, engine ECU 300 controls throttle valve 70 such that the throttle opening position is a predetermined opening position.

In S106, engine ECU 300 controls driver motor 530 such that TCV 510 in the full-open state operates to close to a predetermined opening position. In other words, driver motor 530 is controlled such that TCV 510 operates by a predetermined operating quantity.

In S108, engine ECU 300 detects the current value of driver motor 530. Since the current value of driver motor 530 is determined by engine ECU 300 itself, the current value is detected within engine ECU 300.

In S110, engine ECU 300 determines whether or not the current value of driver motor 530 is smaller than determination value S (I). When the current value of driver motor 530 is smaller than determination value S (I) (YES in S110), the process proceeds to S112. Otherwise (NO in S110), the process proceeds to S114.

In S112, engine ECU 300 determines that TCV 510 is abnormal. In S114, engine ECU 300 determines that TCV 510 is normal.

In S120, engine ECU 300 determines whether or not a predetermined learning condition is satisfied. The learning condition refers to the condition for example that the voltage of an auxiliary battery (not shown) is equal to or larger than a threshold value, the atmospheric pressure is in a predetermined range and the outside temperature is in a predetermined range. The learning condition is not limited to this one. When the learning condition is satisfied (YES in S120), the process proceeds to S122. Otherwise (NO in S120), the process is ended.

In S122, engine ECU 300 controls driver motor 530 such that TCV 510 in the full-close state changes to the full-open state. Namely, driver motor 530 is controlled such that TCV 510 operates by a predetermined operating quantity. In S124, engine ECU 300 measures the time required by TCV 510 to change from the full-close state to the full-open state while engine 10 is stopped.

In S126, engine ECU 300 corrects (learns) determination value S (I). Determination value S (I) is corrected such that determination value S (I) is larger as the time required by TCV 510 to change from the full-close state to the full-open state while engine 10 is stopped is longer.

Operation will be described of engine ECU 300 that is the abnormality determination apparatus in the present embodiment, based on the above-described structure and flowchart.

When engine 10 is operating (YES in S100), it is determined whether or not the abnormality determination condition is satisfied (S102). In the state where fuel cut is effected, the intake air quantity is in a predetermined range and the engine speed is in a predetermined range, this state can be regarded as the one where a load is exerted via TCV 510 on driver motor 530 and the load is stable. When the rate of change of the engine speed is not more than a threshold value, this state can be regarded as the one where no hard deceleration is performed and there is ample time to monitor the current value of driver motor 530.

Therefore, when the abnormality determination condition is satisfied, namely when fuel cut is effected, the intake air quantity is in a predetermined range, the engine speed is in a predetermined range and the rate of change of the engine speed is not more than a threshold value (YES in S102), throttle valve 70 is controlled such that the opening position of throttle valve 70 is a predetermined opening position in order to determine abnormality of TCV 510 (S 104). In this way, the intake air quantity can be made stable.

After this, driver motor 530 is controlled such that TCV 510 in the full-open state operates to close to a predetermined opening position (S106), and the current value of driver motor 530 is detected (S108).

When the current value of driver motor 530 is smaller than determination value S (I) (YES in S110), this state can be regarded as the one where the load of driver motor 530 is smaller than that of the normal state, namely the state where any abnormality such as breakage of at least any one of TCV 510 occurs.

In this case, it is determined that TCV 510 is abnormal (S112). In contrast, when the current value of driver motor 530 is not smaller than determination value S (I) (NO in S110), it is determined that TCV 510 is normal (S114).

It is noted that the load of driver motor 530 is influenced by, in addition to the intake air quantity, the frictional coefficient of shaft 520 for example and the oil attaching to shaft 520 for example. Namely, the load of driver motor 530 exerted by the mechanism itself for operating TCV 510 changes with time.

In order to consider the change of load with time for abnormality determination of TCV 510, when the learning condition is satisfied (YES in S120) in the case where engine 10 is stopped (NO in S100) namely the intake air quantity is "zero," driver motor 530 is controlled such that TCV 510 changes from the full-close state to the full-open state (S122). Then, the time consumed by TCV 510 to change from the full-close state to the full-open state while engine 10 is stopped is measured (S124).

When engine 10 is stopped, based on the time required by TCV 510 to change from the full-close state to the full-open state while engine 10 is stopped, determination value S (I) used for the abnormality determination of TCV 510 is corrected (S126). In this way, abnormality of TCV 510 can be precisely determined.

As heretofore described, the engine ECU that is the abnormality determination apparatus in the present embodiment determines that the TCV is abnormal when the driving force of the driver motor namely the current value thereof is smaller than determination value S (I). Thus, even if any one of the four TCV is broken, it can be determined that the TCV is abnormal. Accordingly, the abnormality of the TCV can be precisely determined.

While the present embodiment determines abnormality of TCV 510 using the current value of driver motor 530, any value may be used instead of the current value, such as the voltage value, duty ratio for duty control, namely the value may be any value relevant to the driving force of driver motor 530. Further, an amperemeter may be used to detect the current value of driver motor 530 or a voltmeter may be used to detect the voltage value of driver motor 530.

Further, threshold S (I) may be corrected using the time required for operating TCV 510 by an operating quantity different from the operating quantity required to change from the full-close state to the full-open state.

Second Embodiment

A second embodiment of the present invention will be hereinafter described. The present embodiment differs from the first embodiment in that the abnormality of the TCV is determined using, instead of the current value of the driver motor, the time required by the TCV to change from the full-open state to a predetermined opening position. Other elements are identical to those of the above-described first embodiment. Respective functions thereof are also identical thereto. Therefore, the detailed description of them will not be repeated here.

Figure 7:
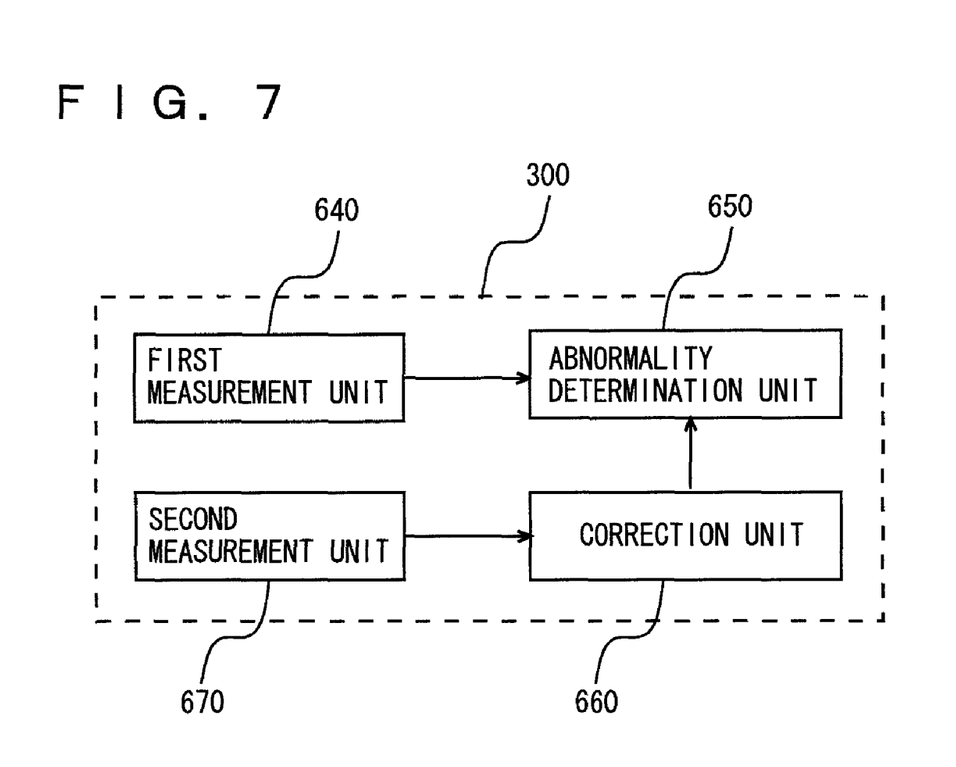
FIG. 7 is a functional block diagram of an engine ECU that is an abnormality determination apparatus according to a second embodiment of the present invention.

Referring to FIG. 7, functions of engine ECU 300 that is an abnormality determination apparatus in the present embodiment will be described. The functions as described below of engine ECU 300 may be implemented by hardware or implemented by software.

Engine ECU 300 includes a first measurement unit 640, an abnormality determination unit 650, a correction unit 660 and a second measurement unit 670.

First measurement unit 640 measures the time represented by ΔT required by TCV 510 to change from the full-open state to a predetermined opening position.

Abnormality determination unit 650 determines that TCV 510 is abnormal in the case where time ΔT required by TCV 510 to change from the full-open state to a predetermined opening position is smaller than determination value S (T). Determination value S (T) is determined according to a map using the intake air quantity as a parameter such that determination value S (T) corresponds to the time required by TCV 510 to change from the full-open state to a predetermined opening position in the case where all TCV 510 are normal.

Based on the time required by TCV 510 to change from the full-close state to the full-open state while engine 10 is stopped, correction unit 660 corrects determination value S (T). For example, determination value S (T) is corrected such that determination value S (T) is larger as the time required by TCV 510 to change from the full-close state to the full-open state while engine 10 is stopped is longer.

Second measurement unit 670 measures the time required by TCV 510 to change from the full-close state to the full-open state while engine 10 is stopped.

Figure 8:
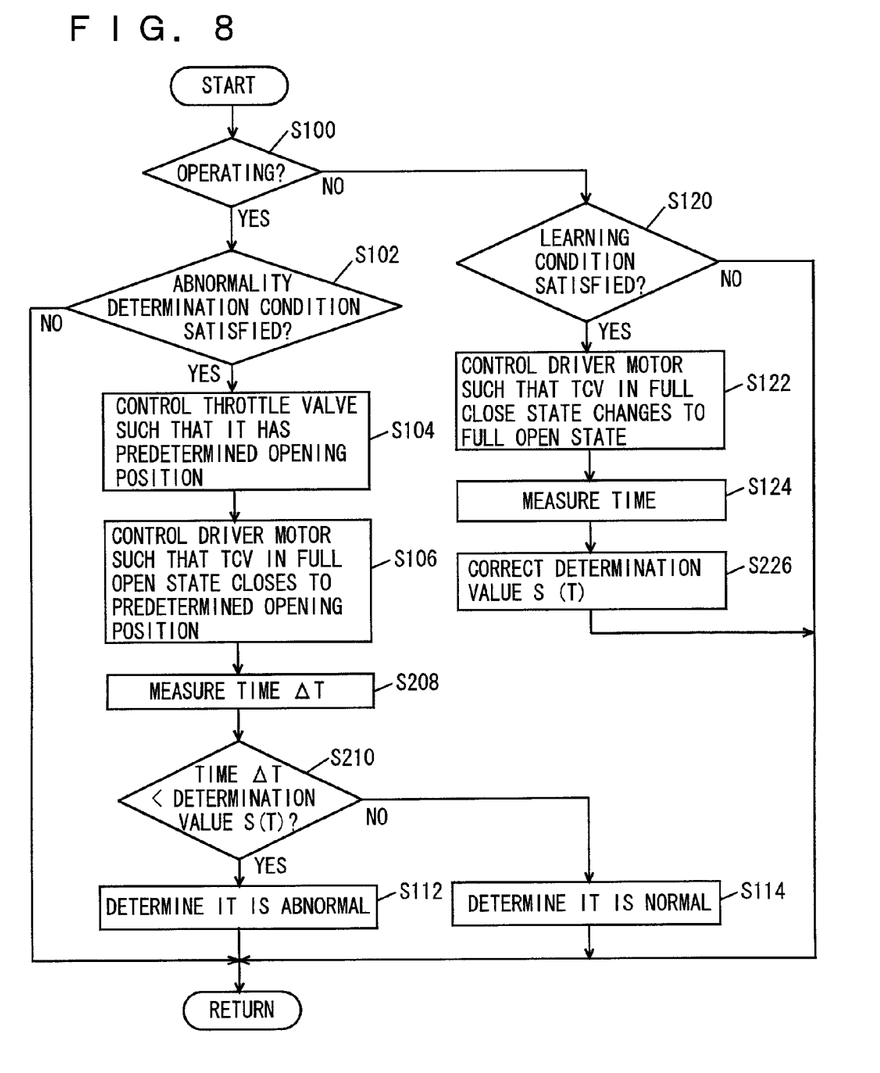
FIG. 8 is a flowchart showing a control structure of a program executed by the engine ECU that is the abnormality determination apparatus according to the second embodiment of the present invention.

Referring to FIG. 8, a control structure of a program executed by engine ECU 300 that is the abnormality determination apparatus in the present embodiment will be described. The program as described below is repeatedly executed in predetermined cycles. The same process step as that of the first embodiment is indicated by the same step number. Therefore, the detailed description thereof will not be repeated here.

In S208, time ΔT required by TCV 510 to change from the full-open state to a predetermined opening position is measured.

In S210, engine ECU 300 determines whether or not time ΔT required by TCV 510 to change from the full-open state to a predetermined opening position is smaller than determination value S (T). When time ΔT required by TCV 510 to change from the full-open state to a predetermined opening position is smaller than determination value S (T) (YES in S210), the process proceeds to S112. Otherwise (NO in S210), the process proceeds to S114.

In S226, engine ECU 300 corrects (learns) determination value S (T). Determination value S (T) is corrected such that determination value S (T) is larger as the time required by TCV 510 to change from the full-close state to the full-open state while engine 10 is stopped is longer. In this way as well, effects similar to those of the above-described first embodiment can be obtained.

Threshold value S (T) may be corrected using the time required for operating TCV 510 by a predetermined operating quantity different from the operating quantity for changing the TCV from the full-close state to the full-open state.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An abnormality determination apparatus for a valve provided to an intake passage of an internal combustion engine, comprising:
    an actuator operating said valve; and
    an operation unit, including
        a detection unit that detects a driving force of said actuator,
        an abnormality determination unit that determines that said valve is abnormal in a case where the driving force of said actuator is smaller than a predetermined determination value, and
        a correction unit that corrects said determination value such that said determination value is larger as time consumed by said valve to operate by a predetermined operating quantity while said internal combustion engine is stopped is longer.

2. The abnormality determination apparatus according to claim 1, wherein
said valve is a tumble control valve.

3. An abnormality determination apparatus for a valve provided to an intake passage of an internal combustion engine, comprising:
an actuator operating said valve; and
an operation unit, including
a measurement unit that measures time consumed by said valve to operate by a predetermined operating quantity,
an abnormality determination unit that determines that said valve is abnormal in a case where the time consumed by said valve to operate by said predetermined operating quantity is shorter than a predetermined determination value, and
a correction unit that corrects said determination value such that said determination value is larger as the time consumed by said valve to operate by a predetermined operating quantity while said internal combustion engine is stopped is longer.

4. The abnormality determination apparatus according to claim 3, wherein
said valve is a tumble control valve.

5. An abnormality determination method for a valve provided to an intake passage of an internal combustion engine, comprising the steps of:
detecting a driving force of an actuator operating said valve;
determining that said valve is abnormal in a case where the driving force of said actuator is smaller than a predetermined determination value; and
correcting said determination value such that said determination value is larger as time consumed by said valve to operate by a predetermined operating quantity while said internal combustion engine is stopped is longer.

6. The abnormality determination method according to claim 5, wherein said valve is a tumble control valve.

7. An abnormality determination method for a valve provided to an intake passage of an internal combustion engine, comprising the steps of:
measuring time consumed by said valve to operate by a predetermined operating quantity;
determining that said valve is abnormal in a case where the time consumed by said valve to operate by said predetermined operating quantity is shorter than a predetermined determination value; and
correcting said determination value such that said determination value is larger as the time consumed by said valve to operate by a predetermined operating quantity while said internal combustion engine is stopped is longer.

8. The abnormality determination method according to claim 7, wherein
said valve is a tumble control valve.

9. An abnormality determination apparatus for a valve provided to an intake passage of an internal combustion engine, comprising:
means for detecting a driving force of an actuator operating said valve,
means for determining that said valve is abnormal in a case where the driving force of said actuator is smaller than a predetermined determination value, and
means for correcting said determination value such that said determination value is larger as time consumed by said valve to operate by a predetermined operating quantity while said internal combustion engine is stopped is longer.

* * * * *